United States Patent
Lin

(10) Patent No.: US 9,742,784 B2
(45) Date of Patent: Aug. 22, 2017

(54) ACCOUNT REGISTRATION AND LOGIN METHOD, AND NETWORK ATTACHED STORAGE SYSTEM USING THE SAME

(71) Applicants: Cal-Comp Electronics & Communications Company Limited, New Taipei (TW); Kinpo Electronics, Inc., New Taipei (TW)

(72) Inventor: Yung-Hsuan Lin, New Taipei (TW)

(73) Assignees: Cal-Comp Electronics & Communications Company Limited, New Taipei (TW); Kinpo Electronics, Inc., New Taipei (TW)

( * ) Notice: Subject to any disclaimer, the term of this patent is extended or adjusted under 35 U.S.C. 154(b) by 118 days.

(21) Appl. No.: 14/989,796

(22) Filed: Jan. 7, 2016

(65) Prior Publication Data
US 2017/0142130 A1    May 18, 2017

(30) Foreign Application Priority Data
Nov. 16, 2015 (CN) .......................... 2015 1 0783011

(51) Int. Cl.
*H04L 29/06* (2006.01)
*H04L 29/08* (2006.01)

(52) U.S. Cl.
CPC .......... *H04L 63/123* (2013.01); *H04L 63/083* (2013.01); *H04L 63/102* (2013.01); *H04L 67/1097* (2013.01)

(58) Field of Classification Search
CPC ... H04L 63/083; H04L 63/102; H04L 63/123; H04L 67/1097
See application file for complete search history.

(56) References Cited

U.S. PATENT DOCUMENTS

2002/0112183 A1*  8/2002  Baird, III .............. H04L 63/083
                                                                726/9
2012/0144201 A1*  6/2012  Anantha ............... H04L 9/0897
                                                                713/172
(Continued)

OTHER PUBLICATIONS

Michael Cobb, "What is OpenID? How to use OpenID SSO in your organisation", Retrieved From http://www.computerweekly.com/news/2240033602/What-is-OpenID-How-to-use-OpenID-SSO-in-your-organisation, Published Mar. 22, 2011.*

(Continued)

Primary Examiner — Chau Le
(74) Attorney, Agent, or Firm — Jianq Chyun IP Office

(57) ABSTRACT

An account registration method for a network attached storage system is provided. The method includes transmitting an open ID and network attached storage information to a cloud management server; transmitting the open ID to a social network service server to perform a verification procedure on the open ID; if the verification procedure is passed, receiving security information corresponding to the open ID from the social network service server and recording the open ID, the security information, and the network attached storage information in the cloud management server; transmitting the open ID to a network attached storage; transmitting login information corresponding to the network attached storage to the user terminal, wherein the login information is generated by the network attached storage according to the open ID; and recording the open ID and the login information in the user terminal.

12 Claims, 3 Drawing Sheets

(56) References Cited

U.S. PATENT DOCUMENTS

| | | | |
|---|---|---|---|
| 2013/0091442 A1* | 4/2013 | Diab | G06Q 30/00 |
| | | | 715/753 |
| 2013/0276085 A1* | 10/2013 | Sharaga | H04L 65/60 |
| | | | 726/8 |
| 2014/0101723 A1* | 4/2014 | Wilkes | G06F 21/00 |
| | | | 726/4 |
| 2015/0066892 A1* | 3/2015 | Astore | G06F 17/30864 |
| | | | 707/707 |
| 2015/0186667 A1* | 7/2015 | Yao | G06F 21/6218 |
| | | | 726/27 |

OTHER PUBLICATIONS

OpenID, "OpenID Connect FAQ and Q&As", Retrieved From http://openid.net/connect/faq/. Published Feb. 26, 2014.*

* cited by examiner

ACCOUNT REGISTRATION AND LOGIN METHOD, AND NETWORK ATTACHED STORAGE SYSTEM USING THE SAME

CROSS-REFERENCE TO RELATED APPLICATION

This application claims the priority benefit of China application serial no. 201510783011.6, filed on Nov. 16, 2015. The entirety of the above-mentioned patent application is hereby incorporated by reference herein and made a part of this specification.

BACKGROUND OF THE INVENTION

Field of the Invention

The invention relates to an account registration and login method, and in particular, an account registration and login method for a network attached storage system.

Description of Related Art

Generally, in a conventional method for logging in to a network attached storage, a manager has to first create an account and a password and transmits the established account and password to a user, such that the user may log in to the network attached storage by using the created account and password. However, the user himself/herself generally needs to memorize the account and password corresponding to the network attached storage. If the user forgets the set of account and/or password, the manager has to reissue the account and/or password to the user (e.g., by sending a text message or e-mail to a recorded telephone number/e-mail address), such that the user may reset the password or log in to the network attached storage. That is, each account/password forms a one-to-one relation with the network attached storage. In other words, a set of account/password is generally used to log in to one network attached storage only.

If the user has a plurality of sets of accounts and passwords corresponding to different network attached storages, the user needs to take extra time and energy to manage these accounts and passwords, which lowers work efficiency.

SUMMARY OF THE INVENTION

In light of the above, the invention provides an account registration and login method and a network attached storage system using the same, such that a user may use one single open ID only to register and log in to a plurality of network attached storages without memorizing accounts and passwords corresponding to each of the network attached storages, thereby enhancing work efficiency.

One embodiment of the invention provides an account registration method for a network attached storage system, wherein the network attached storage system includes a cloud management server, a user terminal and a network attached storage. The method includes transmitting an open ID and network attached storage information to the cloud management server through the user terminal; transmitting the open ID from the cloud management server to a social network service server such that the social network service server performs a verification procedure on the open ID; if the open ID passes the verification procedure, receiving security information corresponding to the open ID from the social network service server through the cloud management server, recording the open ID, the security information, and the network attached storage information in the cloud management server, and transmitting the open ID from the user terminal to the network attached storage; transmitting login information corresponding to the network attached storage from the network attached storage to the user terminal, wherein the login information is generated by the network attached storage according to the open ID; and recording the open ID and the login information corresponding to the network attached storage in the user terminal.

One embodiment of the invention provides an account login method for logging in to a network attached storage through a user terminal via a cloud management server. The method includes transmitting an inputted open ID to the cloud management server to perform a verification procedure on the open ID; if the open ID passes the verification procedure, transmitting, by the cloud management server, a network attached storage list corresponding to the open ID to the user terminal, wherein the network attached storage list records network attached storage information of at least one network attached storage; and using first login information corresponding to a first network attached storage stored in the user terminal to log in to the first network attached storage according to the first network attached storage information of the first network attached storage selected in the at least one network attached storage, wherein the first login information is generated by the first network attached storage in a first registration procedure according to the open ID received from the user terminal.

In light of the above, the account registration and login method provided in the embodiments of the invention allows the user to register and log in to a plurality of network attached storages using one single open ID without additionally recording the passwords corresponding to the network attached storages, thereby enhancing work efficiency.

To provide a further understanding of the aforementioned and other features and advantages of the invention, exemplary embodiments, together with the reference drawings, are described in detail below.

DESCRIPTION OF THE EMBODIMENTS

Figure 1:
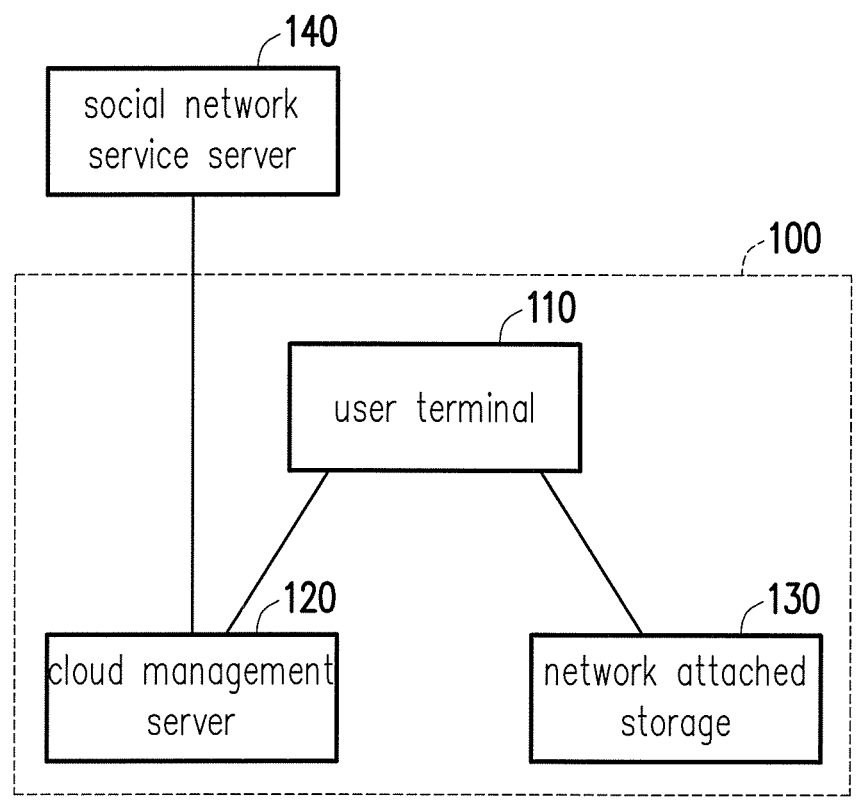
FIG. 1 is a schematic view illustrating a network attached storage system according to one embodiment of the invention.

FIG. 1 is a schematic view illustrating a network attached storage system according to one embodiment of the invention. Referring to FIG. 1, in the present embodiment, a network attached storage system 100 includes a user terminal 110, a cloud management server 120, and a network attached storage 130. Note that although FIG. 1 illustrates one network attached storage only, the invention is not limited hereto. For example, the user terminal 110 may be connected respectively to a plurality of network attached storages. Moreover, the present embodiment provides an account registration and login method applied by executing specific application programs in the user terminal 110, the cloud management server 120, and the network attached storage. Specifically, the user terminal 110 is any suitable electronic device on which an application program is stalled to connect to the network attached storage, such as a smartphone, a tablet computer, a personal computer, and a laptop, for example. In the present embodiment, as an illustrative example, both the network attached storage 130 and the cloud management server 120 operate on the Linux operating system, but the invention is not limited hereto. For example, in other embodiments, the network attached storage 130 and the cloud management server 120 adopt other suitable operating systems for performing management and operation.

To facilitate description, in the following, operations of the user terminal 110 refer to operations related to the network attached storage system 100 performed by a specific application program (also called a network attached storage management application program) of the user terminal 110.

Referring to FIG. 1, the user terminal 110 is connected to the network attached storage 130 and the cloud management server 120 for receiving input information of a user to register, log in to, or access the network attached storage 130. The network attached storage 130 is a specialized data storage device that allows users using different operating systems to access through network connection. In other words, the network attached storage 130 is also seen as a storage device that uses network attached storage techniques and is able to directly connect to a computer network to provide a centralized data access service for users of heterogeneous networks. Note that in the present embodiment, the network attached storage 130 communicates with the user terminal 110 by executing specific application programs to thereby realize the registration and login method of the present embodiment.

The cloud management server 120 is connected to a social network service server 140 and the user terminal 110 to perform identity verification on specific data (e.g., an open ID of the user) by data exchange with the social network service server. For example, the cloud management server 120 includes a processing unit, a communication unit, an open ID management unit, and an information database constituted by hardware circuit units. The processing unit serves to manage overall operation of the cloud management server 120. The communication unit serves to establish a connection with the user terminal 110 and the social network service server 140. The open ID management unit serves to manage verification of the open ID and corresponding storage operations. The information database serves to record the open ID, network attached storage information, and security information corresponding to the open ID. In another example, the cloud management server 120 includes a processing unit and a storage unit, and the cloud management server 120 applies the registration and login method of the present embodiment described below by having the processing unit executes specific program codes stored in the storage unit. To facilitate description, in the following, the cloud management server 120 alone is used as an example to illustrate the overall account registration and login method used by the cloud management server 120 as provided in the present embodiment.

The social network service server 140 is a server providing social networking services (SNS). Examples of websites providing social networking services (also called social network service websites) include Facebook, Google+, YouTube, the Renren Network, LinkedIn, and Twitter. A user registered at a social network service website usually has an open ID corresponding to the social network service website. The form of this open ID varies depending on the mode of registration and login of the corresponding social network service website. In the present embodiment, as an illustrative example, the open ID is an e-mail address of the user, but the invention is not limited hereto. For example, the open ID may also be a specific account name of the user. Generally speaking, after a user completes registration at a social network service website, the user can log in using the registered open ID. In a login procedure, the social network service website performs identity verification on the open ID logged in to by the user according to the verification information (e.g., a password) previously registered by the user. Note that operations performed by the social network service website as described below are managed and performed by the social network service server 140 of the social network service website.

The user may also log in to another social network service website using the same open ID. Specifically speaking, when the user log in to another social network service website (or a general website), said another social network service website allows the user to login in using an open ID registered at a social network service website (or a website providing an open ID service). When the user selects to log in to said another social network service website using the open ID registered at the social network service website, said another social network service website issues a request for verification of the open ID to the social network service website to verify if the open ID provided by the user is legitimate. For example, the social network service website performs a verification procedure on the open ID. When the social network service website receives a verification request issued by another social network service website, the social network service website performs the verification procedure to allow the user to input the previously registered verification information corresponding to the open ID. If the inputted verification information is correct, the social network service website determines that the user's identity is legitimate (namely, the open ID passes the verification procedure) and notifies said another social network service website such that said another social network service website allows the user to log in to said another social network service website using the open ID. In other words, when the user logs in to (or register at) one website using an open ID, the website communicates with a website corresponding to the open ID (e.g., the website at which the open ID is previously registered) to confirm if the user's identity is legitimate to thereby allow the user to log in using the open ID.

For example, when a user intends to perform a registration procedure at a website A, the website A provides the user with an option of registration and login using an open ID registered at a website B. When the user selects to register and log in using the open ID registered at the website B, the website B allows the user to input the open ID and a corresponding password previously registered at the website B to perform identity verification, by means of a pop-up inquiry window, for example. If the inputted open ID and the password match, it is determined that the user's identity is legitimate, and information of successful verification is sent back to the website A such that the website A allows registration and login of the user. In addition, the website B may also provide the website A with data previously registered by the user at the website B to allow the website A to set up data of the user at the website A. Accordingly, by using one single open ID, the user does not need to memorize accounts and passwords respectively corresponding to different social network service websites.

Note that in the example above, when the website A receives a login by the user using the open ID (or when the user requests a service provided by the website A using the open ID), the website A also issues a verification request to the website B to inquire if the user is still in the state of logging in to the website B (or a service provided by the website B) using the open ID. Thereby, legitimacy of the open ID is confirmed to further allow the user to use the open ID to log in to the website A (or to allow the user to use the open ID to obtain the service provided by the website A).

Figure 2:
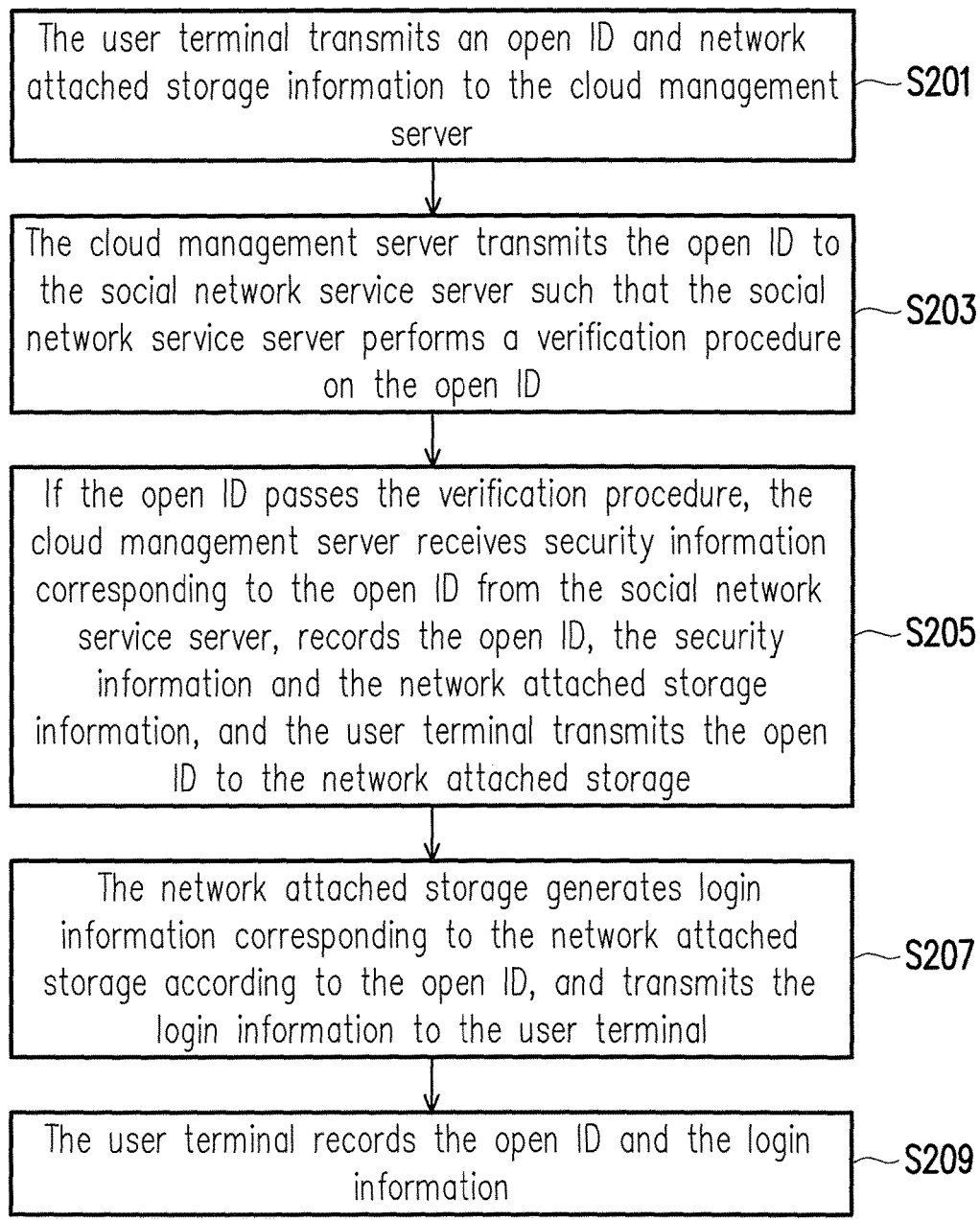
FIG. 2 is a flowchart illustrating a registration operation for registering a network attached storage system using an open ID according to one embodiment of the invention.

Referring to both FIG. 1 and FIG. 2, the following details a registration method for registering a network attached storage using an open ID as provided in the present embodiment.

FIG. 2 is a flowchart illustrating a registration operation for registering a network attached storage system using an open ID according to one embodiment of the invention. Referring to both FIG. 1 and FIG. 2, in the present embodiment, suppose the user uses an open ID at the user terminal 110 to register the network attached storage 130, and the user terminal 110 is already connected to the cloud management server 120.

In step S201, the user terminal 110 transmits an open ID and network attached storage information to the cloud management server 120. In the present embodiment, the user inputs the open ID registered at the social network service server 140 into the user terminal 110 to perform an account registration procedure for registering the network attached storage 130. However, the invention is not limited hereto. For example, the user may also select one option at the user terminal 110 to indicate that the account registration procedure is to be performed using the open ID registered at the social network service server 140. The detailed operation is similar to the operation wherein the open ID registered at one social network service website is used in another social network service website as described above and shall not be repeated here. The network attached storage information includes a device ID and a network path (e.g., an Internet address) corresponding to the network attached storage 130. The device ID corresponding to the network attached storage 130 is a specific code corresponding to the network attached storage 130 that allows other devices to recognize the identity of the network attached storage 130. The network path corresponding to the network attached storage 130 is path information that allows other devices to establish network connection with the network attached storage 130. The network path corresponding to the network attached storage 130 is an IP address of the network attached storage 130 or an address of the network attached storage 130 in a local area network, for example. The user manually inputs the network attached storage information corresponding to the network attached storage 130 into the user terminal 110 to perform the procedure of registering the network attached storage 130. Alternatively, the user terminal 110 obtains the network attached storage information corresponding to the network attached storage 130 by other means. The invention does not limit the method of obtaining the network attached storage information. For example, the user terminal 110 establishes a database having a plurality of entries of network attached storage information, which includes the network attached storage information corresponding to the network attached storage 130. The network attached storage information in the database is extensible.

In step S203, the cloud management server 120 transmits the open ID to the social network service server 140 such that the social network service server may perform a verification procedure on the open ID. Specifically speaking, similar to the foregoing description of the open ID, after receiving the open ID, the cloud management server 120 may transmit the open ID to the social network service server 140 (through web page redirection, for example) and requests the social network service server 140 to verify the open ID. When the social network service server 140 receives the open ID and the verification request, the social network service server 140 performs a corresponding verification procedure. In the present embodiment, for example, the verification procedure includes popping up an inquiry window at the user terminal through web page redirection to allow the user to input the open ID and the verification information (e.g., a password) corresponding to the open ID. The social network service server 140 receives information inputted by the user and compares if the information inputted by the user matches the verification information previously set up by the user in the social network service server 140. If it does, the social network service server 140 determines that the verification information is correct and further determines that the user's identity is legitimate. In other words, when the verification information inputted by the user in the verification procedure is correct, the open ID passes the verification procedure.

Note that in another embodiment, when the social network service server 140 receives the open ID and the verification request, the social network service server 140 determines if the device corresponding to the open ID is identical to the device currently using the open ID to utilize the service provided by the social network service server 140. If the two are identical, the social network service server 140 determines that the open ID is legitimate, and the open ID passes the verification procedure.

In the present embodiment, when the social network service server 140 determines that the open ID passes the verification procedure, the social network service server 140 generates security information corresponding to the open ID passing the verification procedure. The security information includes a security key corresponding to the open ID and an expire time corresponding to the security key. In another embodiment, the security information is a token and an expire time corresponding to the token. The security key (or token) is a code generated by a specific method (or by random method), and a length thereof is generally 64 bit. However, the invention is not limited hereto. For example, the security information may also include data in other forms or other lengths. The security information is a specific coding consisting of letters and/or numbers and serves as confirmation information corresponding to the open ID. The expire time serves to indicate the legitimate time of the corresponding security key. In other words, if the current time (e.g., the local time) is later than the expire time, it means that the security key is no longer valid. The social network service server 140 transmits the generated security information to the cloud management server 120 (through web page redirection, for example) to respond to the verification request regarding the open ID from the cloud management server 120.

In step S205, if the open ID passes the verification procedure, the cloud management server 120 receives the security information corresponding to the open ID from the social network service server 140 to record the open ID, the security information, and the network attached storage information, and the user terminal may transmit the open ID to the network attached storage. Specifically speaking, if the open ID passes the verification procedure, as described above, the social network service server 140 transmits the security information corresponding to the open ID to the cloud management server 120. In other words, after the cloud management server 120 receives the security information, the cloud management server 120 recognizes that the open ID passes verification and determines that the user's identity is legitimate. In the present embodiment, the cloud management server 120 further stores the received open ID, the network attached storage information, and the security information corresponding to the open ID together in the cloud management server 120. In another embodiment, the cloud management server 120 further stores a network attached storage list corresponding to the open ID, wherein the network attached storage list records the network attached storage information of all network attached storages corresponding to the open ID. Moreover, the cloud management server 120 stores the open ID, the network attached storage information corresponding to the open ID (or the network attached storage list), and the security information corresponding to the open ID in the information database for future consultation, wherein the information database is installed interior or exterior to the cloud management server 120 and shall not be limited in the invention.

In the present embodiment, the security information corresponding to the open ID serves in future verification of the open ID. For example, if the cloud management server 120 later receives the open ID from the user terminal 110, the cloud management server 120 searches the security information corresponding to the same open ID stored in the cloud management server 120 according to the received open ID to further determine if the received open ID is valid or legitimate. If the received open ID is determined to be valid or legitimate, the cloud management server 120 performs a subsequent operational procedure or responds to a request accompanying the legitimate open ID.

In the present embodiment, after the cloud management server 120 receives the security information corresponding to the open ID, the cloud management server 120 issues a message to indicate to the user terminal 110 that the open ID is legitimate (passing the verification procedure). Accordingly, after confirming that the open ID is legitimate (passing the verification procedure), the user terminal 110 transmits the open ID to the network attached storage 130 via the connection between the user terminal 110 and the network attached storage 130 to perform a subsequent account registration/login procedure.

In step S207, the network attached storage 130 generates login information corresponding to the network attached storage 130 according to the open ID and transmits the login information to the user terminal 110. Specifically speaking, the network attached storage with the Linux operating system requires the user to log in by a set of account and password. When the network attached storage 130 receives the open ID, the network attached storage 130 generates a user name and a password corresponding to the user name according to the open ID, and adopts the generated user name and password as the login information corresponding to the open ID. Moreover, the network attached storage 130 sets up access authority corresponding to the login information. Later, a user having the open ID is allowed to login in to and access the network attached storage 130 by using the user name and password. If the user logs in to the network attached storage 130 using the login information and the network attached storage 130 confirms the login information, the network attached storage 130 allows the user to access the network attached storage 130 according to the access authority corresponding to the login information.

In the present embodiment, the network attached storage 130 generates the user name according to the open ID received from the user terminal 110. For example, suppose the open ID is in the form of an e-mail (e.g., openid001@nas.com). The network attached storage 130 generates the user name according to the string left to the character "@" therein. For example, suppose the open ID is openid001@nas.com. The network attached storage 130 generates a user name "openid001" according to "openid001 @nas.com". However, the invention is not limited to the method of generating the user name here. For example, in another embodiment, the network attached storage 130 also generates a user name corresponding to the open ID by other methods.

In addition, the network attached storage 130 generates the password corresponding to the user name by a random method (or by another predetermined method). The network attached storage 130 may store the login information including the generated user name and password and the corresponding access authority. The network attached storage 130 may further transmit the login information to the user terminal 110.

Note that although the login information is a set of user name and password in the present embodiment, the invention is not limited hereto. For example, in another embodiment, the login information also correspondingly generates login information in other forms according to the operating system used by the network attached storage 130.

In step S209, the user terminal 110 records the open ID and the login information. For example, when the user terminal 110 receives the login information corresponding to the open ID from the network attached storage 130, the user terminal 110 may store the open ID and the login information corresponding to the open ID (namely, login information corresponding to the network attached storage 130), such that through the open ID, the login information corresponding to the open ID would be used later to log in to the corresponding network attached storage 130.

It should be noted that, in another embodiment, the user terminal 110 may also transmit the received login information to the cloud management server 120, such that the cloud management server 120 may store the login information corresponding to the open ID and the network attached storage 130. Specifically, the cloud management server 120 may store the login information in the network attached storage information of the corresponding network attached storage 130 of the network attached storage list. Accordingly, after the open ID passes the verification procedure, the cloud management server 120 may transmit the corresponding login information and network attached storage information to the user terminal 110 such that the user terminal 110 may log in to the network attached storage 130 accordingly.

Note that in response to the completed registration procedure described above, the user terminal 110 is also able to directly access the network attached storage 130.

In addition, when the user terminal 110 receives the login information, the user terminal 110 displays the login information to notify the user of the login information of the network attached storage 130 registered through the open ID. Accordingly, the user is also allowed to log in to the network attached storage 130 using the login information. Referring to both FIG. 1 and FIG. 3, the following details an account login method for logging in to a network attached storage using the open ID as provided in the present embodiment.

Figure 3:
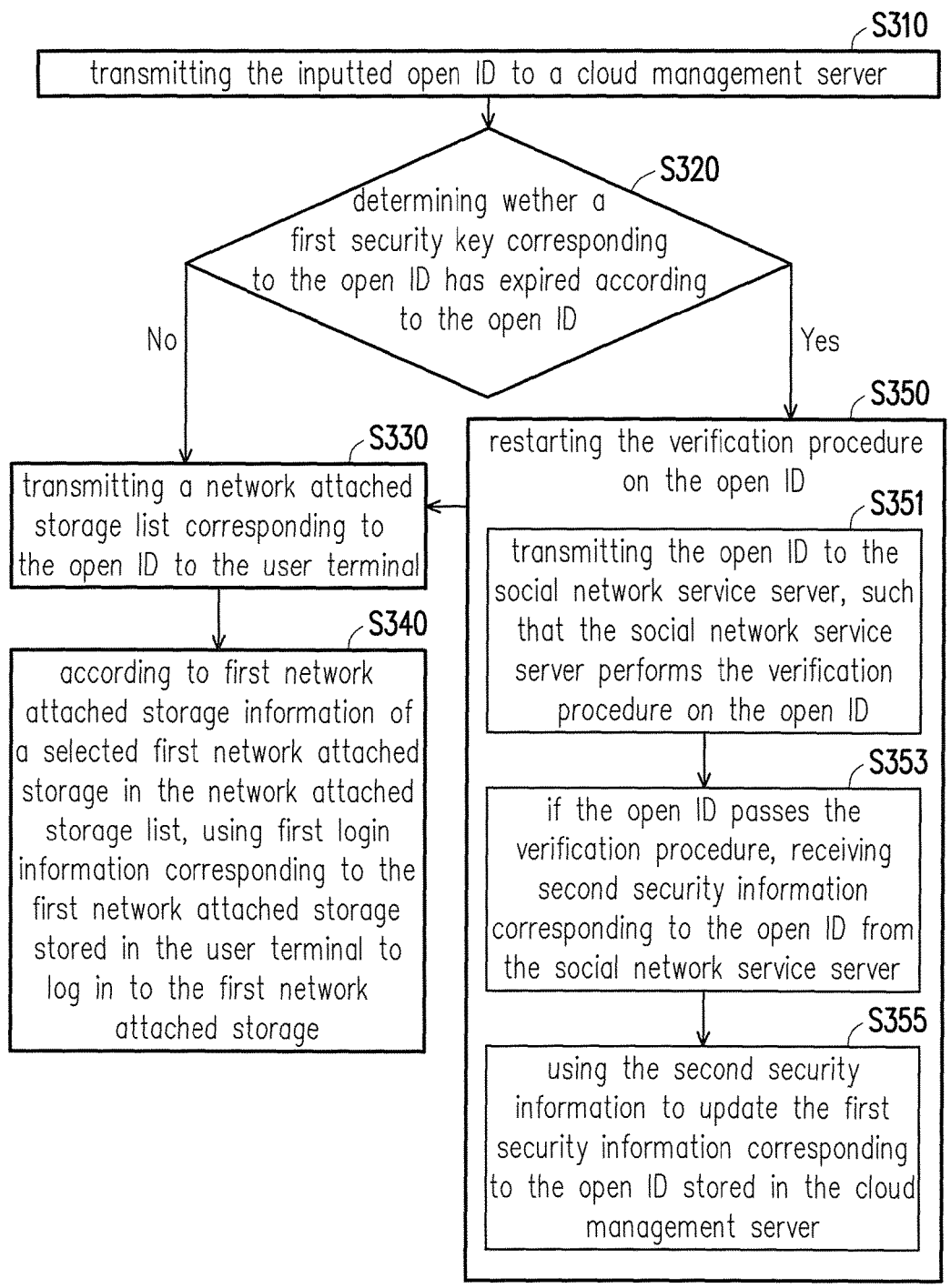
FIG. 3 is a flowchart illustrating login steps of logging in to a network attached storage system using an open ID according to one embodiment of the invention.

FIG. 3 is a flowchart illustrating login steps of logging in to a network attached storage system using an open ID according to one embodiment of the invention. Referring to both FIG. 1 and FIG. 3, suppose a user inputs an open ID at a user terminal 110 to request login to a network attached storage 130, and the user terminal 110 is already connected to a cloud management server 120.

First, in step S310, the user terminal 110 transmits the inputted open ID to the cloud management server 120. Thereby, the user terminal 110 verifies legitimacy of the inputted open ID through the cloud management server 120.

In step S320, according to the open ID, the cloud management server 120 determines if a first security key corresponding to the open ID has expired. Specifically speaking, if the cloud management server 120 determines that the inputted open ID has not been registered, the cloud management server 120 may perform the above-described registration procedure for registering the network attached storage using the open ID. Conversely, if the open ID has been registered, the cloud management server 120 may determine whether the first security key corresponding to the open ID has expired according to security information corresponding to the open ID to further determine legitimacy of the open ID.

More specifically, as described above, the security information (also called the first security information) corresponding to the open ID stored in the cloud management server 120 includes a security key (also called the first security key) and an expire time (also called the first expire time) corresponding to the first security key. The cloud management server 120 determines if the first security key is valid according to the first expire time. More specifically, the cloud management server 120 determines if the local time is later than the first expire time. If the user terminal 110 determines that the local time is no later than the first expire time, the user terminal 110 determines that the first security key has not expired (namely, the first security key is valid). Conversely, if the user terminal 110 determines that the local time is later than the first expire time, the user terminal 110 may determine that the first security key has expired (namely, the first security key is invalid).

If, in step S320, the cloud management server 120 determines that the first security key has not expired, in step S330, the cloud management server 120 transmits a network attached storage list corresponding to the open ID to the user terminal 110. Specifically speaking, the network attached storage list corresponding to the open ID includes a plurality of entries of network attached storage information corresponding to the open ID, wherein each entry of the network attached storage information includes a device ID and a network path of each of the network attached storages registered through the open ID. If the open ID received from the user terminal 110 is determined to be legitimate, the cloud management server 120 may transmit the network attached storage list to the user terminal 110 such that the user terminal 110 may obtain the network attached storage information corresponding to the open ID.

After receiving the network attached storage list from the cloud management server 120, in step S340, the user terminal 110 uses first login information corresponding to a first network attached storage stored in the user terminal 110 to log in to the first network attached storage according to the first network attached storage information of the first network attached storage selected in the network attached storage list. Specifically speaking, after receiving the network attached storage list, the user terminal 110 may display to the user the plurality of network attached storages included in the network attached storage. The user accordingly selects one of the network attached storages (also called the first network attached storage). If the user terminal 110 recognizes that the first network attached storage is selected, the user terminal 110 may establish a connection with the first network attached storage according to the first network attached storage information (e.g., a network path of the first network attached storage) of the first network attached storage, and obtains a device ID of the first network attached storage according to the first network attached storage information to further recognize the first login information corresponding to the first network attached storage stored in the user terminal. Next, the user terminal 110 uses the first login information to log in to the first network attached storage.

If, in step S320, the cloud management server 120 determines that the first security key has expired, in step S350, the cloud management server 120 may restart the verification procedure on the open ID. In other words, after determining that the first security key corresponding to the open ID has expired, the cloud management server 120 transmits the open ID again to the social network service server 140, such that the social network service server 140 may perform the verification procedure on the open ID. If the open ID passes the verification procedure, the security information transmitted from the social network service server 140 to the cloud management server 120 is used to update the security information corresponding to the open ID. Generally, step S350 is similar to the above-described verification procedure for registering the open ID at the network attached storage. Specifically speaking, in step S351, the cloud management server 120 transmits the open ID to the social network service server 140, such that the social network service server 140 performs the verification procedure on the open ID. In step S353, if the open ID passes the verification procedure, the cloud management server 120 receives second security information (e.g., newly obtained security information) corresponding to the open ID from the social network service server. In step S355, the cloud management server 120 may use the second security information to update the first security information corresponding to the open ID stored in the cloud management server 120. For example, the second security key in the second security information replaces the originally stored first security key in the first security information, and the second expire time in the second security information replaces the originally stored first expire time in the first security information.

After the cloud management server 120 updates the first security information corresponding to the open ID stored in the cloud management server 120, since legitimacy of the open ID has been confirmed (namely, in step S353, the open ID passes the verification procedure), the login procedure returns to step S330. Specifically speaking, as described above, if the cloud management server 120 determines that the open ID has passed the verification procedure, the cloud management server 120 may transmit a message to the user terminal 110 to indicate to the user terminal that the open ID is legitimate (having passed the verification procedure), such that the user terminal 110 may proceed to perform step S330 and transmit the network attached storage list corresponding to the open ID to the user terminal.

In another embodiment, if, in step S320, the cloud management server 120 determines that the first security key has expired, the cloud management server 120 may transmit a request to the social network service server 140 to request the social network service server 140 to confirm if the device issuing the open ID still uses the open ID to log in to/use the service/website provided by the social network service server 140. If the device issuing the open ID still uses the open ID to log in to/use the service/website provided by the social network service server 140, the social network service server 140 transmits the security information corresponding to the open ID to the cloud management server 120, and the cloud management server 120 may determine that the open ID has passed the verification procedure.

Note that in the foregoing process of registering/logging in to the network attached storage using the open ID, if the open ID does not pass the verification procedure or if an error occurs in the verification procedure on the open ID, the cloud management server 120 may issue a warning message to the user terminal 110 to notify the user.

In summary of the above, the account registration and login method and the network attached storage system using the registration and login method as provided in the embodiments of the invention allow the user to register and log in to one or more network attached storages by using one single open ID. After the open ID passes verification, a network attached storage list corresponding to the open ID is provided for the user. Accordingly, the user is allowed to log in to the network attached storage without additionally recording a password corresponding to the network attached storage, thereby enhancing work efficiency. In other words, through an open ID, the user registers and authorizes an available network attached storage via the cloud management server as an identification mechanism for logging in to the network attached storage. Moreover, the user is allowed to further use the same open ID to register other network attached storages at the cloud management server, such that the one single open ID is used by the user to register/log in to a plurality of network attached storages, thereby forming a one-to-many relation between the open ID and the plurality of network attached storages.

Although the invention is disclosed as the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:

1. An account registration method for a network attached storage system, wherein the network attached storage system comprises a cloud management server, a user terminal, and a network attached storage, the method comprising:
   transmitting an open ID and network attached storage information to the cloud management server through the user terminal;
   transmitting the open ID from the cloud management server to a social network service server such that the social network service server performs a verification procedure on the open ID;
   receiving security information corresponding to the open ID from the social network service server through the cloud management server if the open ID passes the verification procedure, recording the open ID, the security information, and the network attached storage information in the cloud management server, and transmitting the open ID from the user terminal to the network attached storage;
   transmitting login information corresponding to the network attached storage from the network attached storage to the user terminal, wherein the login information is generated by the network attached storage according to the open ID; and
   recording the open ID and the login information corresponding to the network attached storage in the user terminal.

2. The account registration method according to claim 1, wherein the network attached storage information comprises a device ID and a network path corresponding to the network attached storage.

3. The account registration method according to claim 1, wherein the open ID is for a user to log in to a social network service provided by the social network service server, wherein the social network service server determines that the open ID passes the verification procedure if verification information corresponding to the open ID received in the verification procedure is correct.

4. The account registration method according to claim 1, wherein the security information comprises a security key corresponding to the open ID and an expire time corresponding to the security key.

5. The account registration method according to claim 1, wherein the step of recording the open ID, the security information, and the network attached storage information in the cloud management server comprises:
   storing a network attached storage list corresponding to the open ID, wherein the network attached storage list corresponding to the open ID records network attached storage information of at least one network attached storage registered through the open ID; and
   storing the open ID, the network attached storage list corresponding to the open ID, and the security information in a database.

6. The account registration method according to claim 1, wherein the login information comprises a user name and a password, wherein the step of generating the login information by the network attached storage according to the open ID comprises:
   setting up the user name corresponding to the open ID according to the open ID and generating the password corresponding to the user name by a random method; and
   adopting the user name corresponding to the open ID and the password corresponding to the user name as the login information, wherein the login information is used to log in to the network attached storage.

7. An account login method for logging in to a network attached storage through a user terminal via a cloud management server, the method comprising:
   transmitting an inputted open ID to the cloud management server to perform a verification procedure on the open ID;
   transmitting, by the cloud management server, a network attached storage list corresponding to the open ID to the user terminal if the open ID passes the verification procedure, wherein the network attached storage list records network attached storage information of at least one network attached storage; and
   using first login information corresponding to a first network attached storage stored in the user terminal to log in to a first network attached storage according to the first network attached storage information of the first network attached storage selected among the at least one network attached storage, wherein the first login information is generated by the first network attached storage in a first registration procedure according to the open ID received from the user terminal.

8. The account login method according to claim 7, wherein the step of performing the verification procedure on the open ID comprises:
   identifying first security information corresponding to the open ID stored in the cloud management server according to the open ID, wherein the first security information comprises a first security key and a first expire time corresponding to the first security key;

determining whether the first security key has expired according to the first expire time and a local time; and if the local time is no later than the first expire time, determining that the first security key has not expired, and determining that the open ID passes the verification procedure.

9. The account login method according to claim 8, further comprising:

determining that the first security key has expired and transmitting the open ID to a social network service server from the cloud management server if the local time is later than the first expire time, such that the social network service server performs the verification procedure on the open ID;

receiving second security information corresponding to the open ID from the social network service server through the cloud management server if the open ID passes the verification procedure, wherein the second security information comprises a second security key and a second expire time corresponding to the second security key; and using the second security information to update the first security information stored in the cloud management server.

10. The account login method according to claim 7, wherein the first login information comprises a user name and a password, wherein the step of generating the first login information by the first network attached storage in the first registration procedure according to the open ID received from the user terminal comprises:

setting up the user name corresponding to the open ID according to the open ID received from the user terminal and generating the password corresponding to the user name by a random method; and adopting the user name corresponding to the open ID and the password corresponding to the user name as the login information and transmitting the login information to the user terminal, wherein the login information is used to log in to the network attached storage.

11. A network attached storage system comprising:

a cloud management server;

a user terminal, connected to the cloud management server, is configured to transmit an open ID and network attached storage information to the cloud management server; and at least one network attached storage, connected to the user terminal, wherein the cloud management server transmits the open ID to a social network service server such that the social network service server performs a verification procedure on the open ID, wherein the cloud management server receives security information corresponding to the open ID from the social network service server if the open ID passes the verification procedure and records the open ID, the security information, and the network attached storage information in the cloud management server, and the user terminal transmits the open ID to the network attached storage, wherein the network attached storage transmits login information corresponding to the network attached storage to the user terminal, wherein the login information is generated by the network attached storage according to the open ID, wherein the user terminal records the open ID and the login information corresponding to the network attached storage in the user terminal.

12. A network attached storage system comprising:

a cloud management server;

a user terminal, connected to the cloud management server, is configured to transmit an inputted open ID to the cloud management server to perform a verification procedure on the open ID; and at least one network attached storage, connected to the user terminal, wherein the cloud management server transmits a network attached storage list corresponding to the open ID to the user terminal if the open ID passes the verification procedure, wherein the network attached storage list records network attached storage information of at least one network attached storage, wherein the user terminal uses first login information corresponding to a first network attached storage stored in the user terminal to log in to the first network attached storage according to the first network attached storage information of the first network attached storage selected in the network attached storage list, wherein the first login information is generated by the first network attached storage in a first registration procedure according to the open ID received from the user terminal.

* * * * *